United States Patent
Wong et al.

(10) Patent No.: US 7,363,632 B2
(45) Date of Patent: *Apr. 22, 2008

(54) CLIENTLESS EXTERNAL STORAGE DEVICE

(75) Inventors: Yin Hui Wong, Taipei (TW); Cheen Liao, Taipei (TW); Jia-Shiun Lee, Taipei (TW); Tu Dun Hong, Taipei (TW)

(73) Assignee: Synology, Inc., Taipei (TW)

( * ) Notice: Subject to any disclaimer, the term of this patent is extended or adjusted under 35 U.S.C. 154(b) by 327 days.

This patent is subject to a terminal disclaimer.

(21) Appl. No.: 11/064,432

(22) Filed: Feb. 22, 2005

(65) Prior Publication Data

US 2005/0216717 A1    Sep. 29, 2005

Related U.S. Application Data

(63) Continuation-in-part of application No. 10/409,946, filed on Apr. 8, 2003.

(51) Int. Cl.
*G06F 13/14* (2006.01)
*G06F 13/38* (2006.01)

(52) U.S. Cl. .................... 719/327; 719/313; 719/321
(58) Field of Classification Search ................ 719/313, 719/321, 327
See application file for complete search history.

(56) References Cited

U.S. PATENT DOCUMENTS

| 5,799,199 | A | 8/1998 | Ito |
| 6,668,376 | B1 | 12/2003 | Wang |
| 6,745,255 | B2 * | 6/2004 | Yen et al. ...................... 710/13 |
| 6,754,722 | B2 | 6/2004 | Herzi |
| 6,754,725 | B1 * | 6/2004 | Wright et al. .................. 710/8 |
| 6,933,924 | B2 * | 8/2005 | Garcia ........................ 345/163 |
| 2002/0049883 | A1 * | 4/2002 | Schneider et al. .......... 711/100 |
| 2002/0069353 | A1 | 6/2002 | Smith |
| 2003/0046447 | A1 * | 3/2003 | Kouperchliak et al. ..... 709/321 |
| 2003/0051084 | A1 | 3/2003 | Rosen |

OTHER PUBLICATIONS

"How to Install Windows 3.1 Drivers in Windows 95". Microsoft Corporation. Published Dec. 17, 2000. Access May 4, 2006. http://support.microsoft.com/kb/132946/EN-US/.

* cited by examiner

*Primary Examiner*—William Thomson
*Assistant Examiner*—Richard Pantoliano, Jr.
(74) *Attorney, Agent, or Firm*—Perkins Coie LLP

(57) ABSTRACT

A method for installing an external storage device (such as a hard drive) to a computer is disclosed. The external hard drive includes a driver storage formed integral to the external hard drive. The driver storage stores the device driver information. Upon connection to the computer, the external hard drive's driver storage imitates a known disk drive to the computer. The computer can then access the device driver information and install the external hard drive.

11 Claims, 15 Drawing Sheets

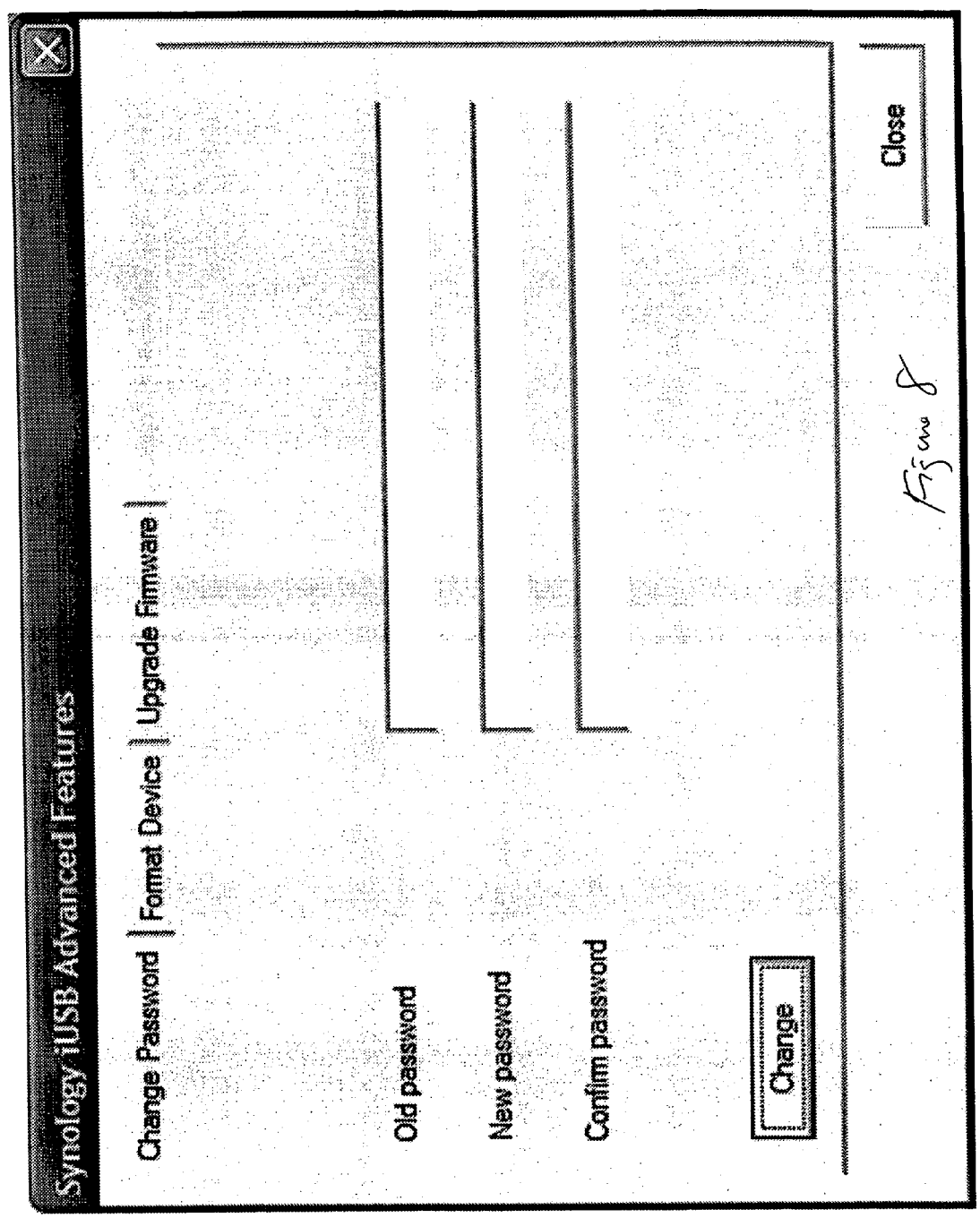

CLIENTLESS EXTERNAL STORAGE DEVICE

RELATED APPLICATIONS

This is a continuation-in-part of U.S. patent application Ser. No. 10/409,946 filed Apr. 8, 2003, priority to which is claimed.

TECHNICAL FIELD

The present invention relates generally to an external storage device for use with a computer system, and more particularly, to a backup hard drive that uses an embedded installation method.

BACKGROUND

A hard drive is a device used to store large amounts of data and is a common component of a desktop or notebook computer. However, hard drives are not solid state devices, and thus have mechanical components that are susceptible to failure.

Because of this, external (meaning external to the desktop or notebook) backup hard drives are often used by computer users to periodically "back up" the data stored on the hard drives in the desktop or notebook computer. Vendors such as Iomega and Western Digital manufacture high capacity external hard drives which can be used for back up purposes.

However, when a new external hard drive (such as an external hard drive) of a computer system is connected to a computer, the operating system of the computer generally issues a request asking the user of the external hard drive to install the appropriate device driver (or client software) for the external hard drive. The user then inserts a disk having stored thereon the device driver or client software. The computer operating system will then automatically execute an auto-run function allowing the user to follow an installation procedure for accomplishing the installation of the device driver onto the computer. In other words, current external back up hard drives require that a "client" be installed on the computer before the external hard drive will operate correctly.

Prior art external hard drives can be connected to the computer by use of a bus, such as a universal serial bus (USB), an IEEE 1394 bus (Firewire), or a peripheral component interconnect bus (PCI). As noted above, when the external hard drive is connected, the operating system of the computer first detects the existence of the external hard drive and then checks if the computer has already been installed with the device driver.

FIG. 1 illustrates an example of how an external hard drive 14 is installed to a computer system 21 in a traditional way. First, the user connects the external hard drive to the USB (or other bus) adapter 24 of the computer 21. The USB adapter 24 issues a signal to the computer indicating that an external hard drive is currently connected to the computer. The USB adapter 24 issues an interrupt signal to the computer 21.

Next, when the computer 21 receives the interrupt signal, it collects the USB installation information from the I/O ports of the USB adapter 24, and if the external hard drive is new, then it issues an inquiry command to the USB adapter 24. Then, the USB adapter 24 issues an inquiry command to the external hard drive using the USB communication protocol, and the external hard drive 14 returns, as depicted in FIG. 1, a value indicating it is an external disk drive. Since a disk device is a piece of fundamental peripheral equipment of any computer system, the host operating system 23 simply takes the added external disk drive 14 as a general storage device.

However, it should be noted that the user typically has to manually install a software program such as volume management software to the computer 21 for the control of the added disk drive.

Traditionally, each external hard drive has associated therewith a detached storage disk (such as a CD-ROM or floppy disk) that stores the device driver and the instructions for its installation. It is not uncommon for external hard drives to be moved from computer system to computer system. Each time the external hard drive is moved, the user must have the storage disk with the driver information. The storage disk may be lost, or worse yet, a wrong driver may be installed. The installation of a wrong device driver may jeopardize the computer system operation.

In other words, the traditional method of using a storage disk to store the device driver and its installation program makes the installation and/or re-installation of a device driver problematical. Accordingly, there exists a need for an easy installation system and product for connecting an external hard drive to computer systems with minimum human intervention and no downloading from a storage disk.

BRIEF DESCRIPTION OF THE DRAWINGS

FIG. 2 is a . . . .

FIGS. 6-8 are screen shots showing how the setup and use of the portable device driver.

Figure 1:
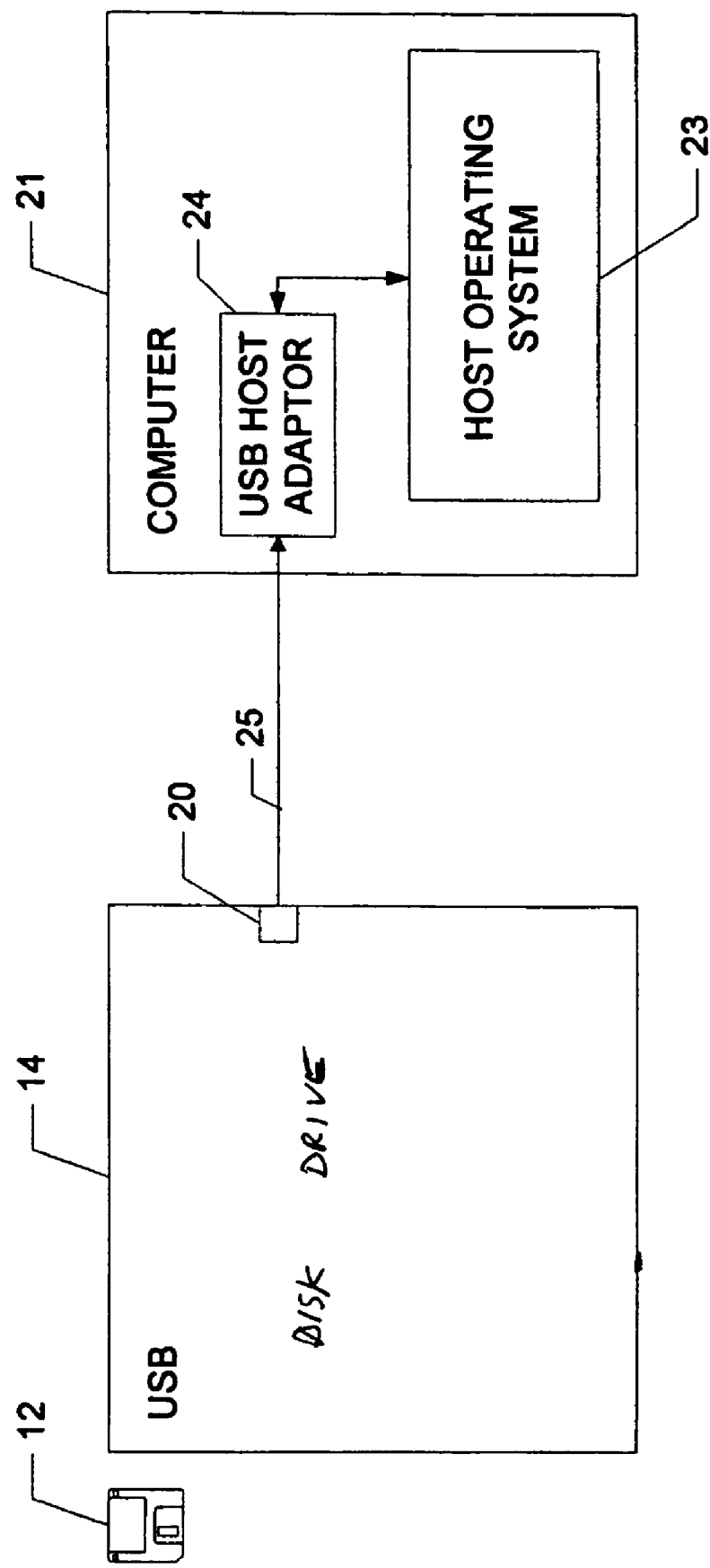
FIG. 1 is a diagram illustrating a conventional method for connecting a USB external disk drive through the USB bus to the host operating system of a computer.

In the drawings, identical reference numbers identify identical or substantially similar elements or acts. To easily identify the discussion of any particular element or act, the most significant digit or digits in a reference number refer to the Figure number in which that element is first introduced (e.g., element 1104 is first introduced and discussed with respect to FIG. 11)

DETAILED DESCRIPTION

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of embodiments of the invention.

Figure 2:
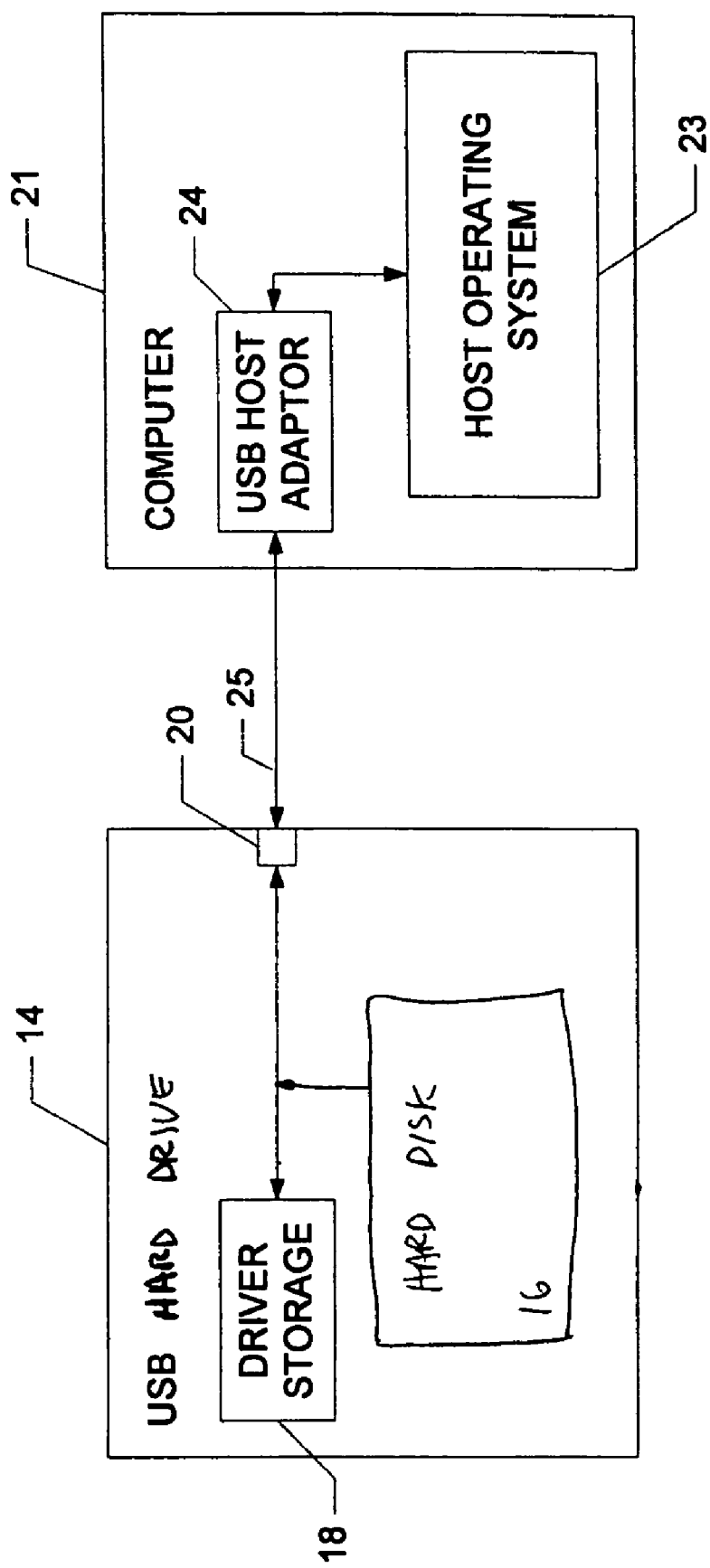

FIG. 2 illustrates an external disk drive 14 that provides a portable device installation system according to one embodiment of the present invention. The external hard drive 14 has driver storage 18 to store the portable device driver and its installation program. The driver storage 18 is connected with the device USB port 20 along with hard disk 16. The driver storage 18 in one embodiment may be non-volatile solid state memory, such as flash memory. Alternatively, the driver storage 18 may be a segment of the hard disk 16, and thus, stored on the hard disk 16 itself.

When the USB port 20 is connected to the USB host adaptor 24 of the computer 21 via USB bus 25, the host operating system 23 of the computer performs the installation of the portable device driver. One example may be a volume manager that drives the hard disk 16. The installation is according to a predetermined procedure stored in the driver storage 18.

As noted above, the driver storage 18 may take any number of memory forms, such as a flash memory or a compact flash device. In addition, in some embodiments, the driver storage 18 may be a hard drive or optical storage medium. While not necessary, in some embodiments, the driver storage 18 may be rewritable to allow for updating of the device driver.

Figure 3A:
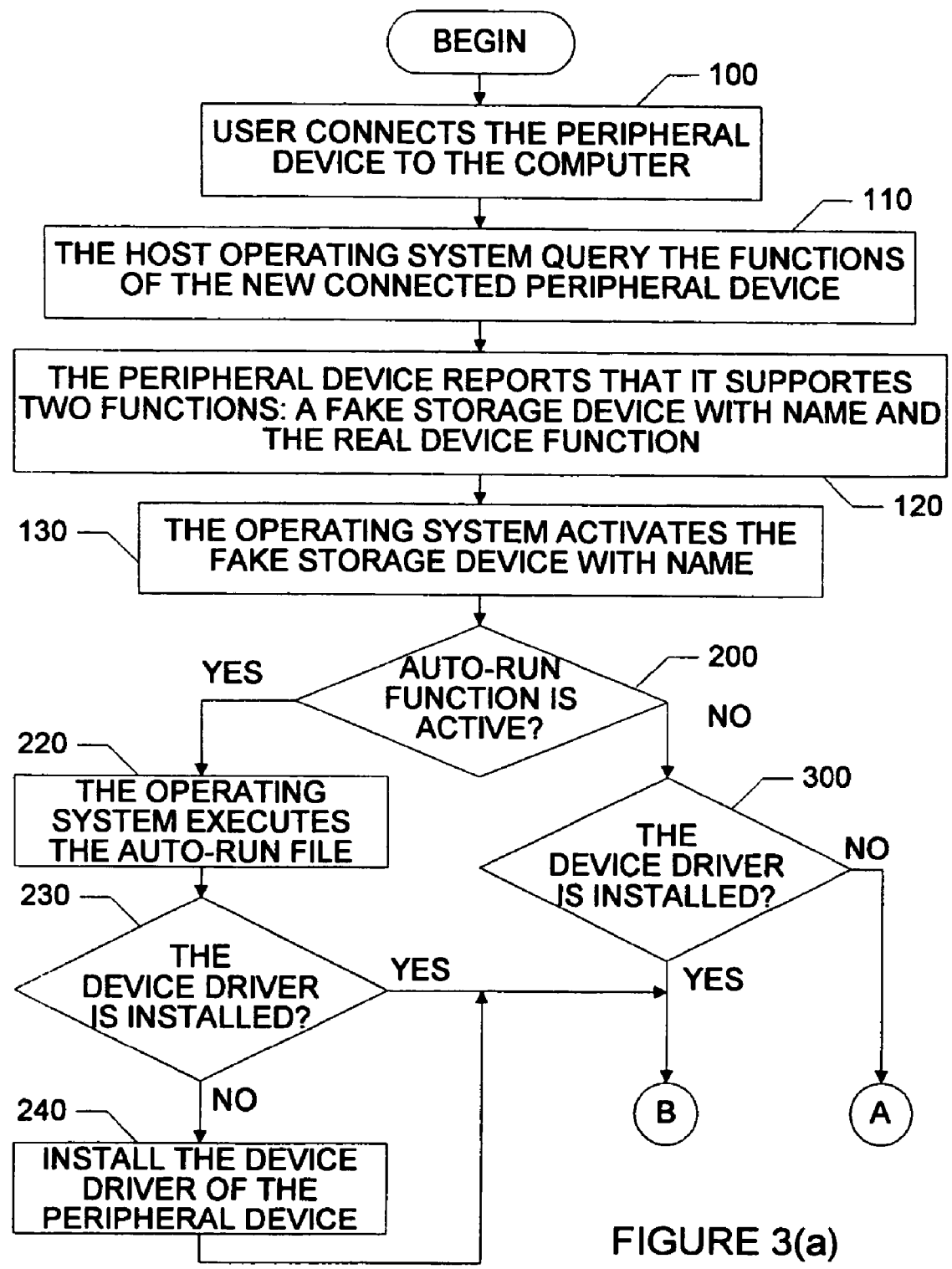
FIG. 3(a)-3(c) are flow charts depicting a system for the installation of a portable device driver in accordance with the present invention.

FIG. 3 shows one embodiment for installing the portable device driver onto a computer system. It should be noted that the description herein is in connection with a USB bus, however, the same or similar procedure can be used with any of the external or internal buses. As shown in FIG. 3(a) at block 100, the procedure starts when the external hard drive 14 connects to the USB bus 25 of the computer 21. At block 110, when the host operating system 23 detects a new connection of the external hard drive 14 to the computer 21, it starts to perform the inquiry function of the external hard drive 14 according to the protocol specified in the device hardware.

Then, at block 120, the external hard drive 14 responds that it can provide two functions: a dummy storage device with a name that is already recognizable by the host operating system 23 and a portable device driver associated with the external hard drive 14. Thus, the dummy storage device 18 appears to the computer as a recognizable disk drive to "fool" the computer into looking at the dummy storage device 18 for the device driver.

Next, at block 130, the host operating system then binds both the dummy storage device and the portable device driver together to enable the execution of the portable device driver installation system of the present invention. As is known in the art, prior to an external hard drive being operable, a computer must first bind the external hard drive with its associated device driver. After a peripheral is binded with its device driver, the computer can utilize the external hard drive via the device driver.

At block 130, the portable device driver installation system detects whether the host operating system currently provides the auto-run function for file execution. In the case when the auto-run function is active in the host operating system 23, then, at block 220, the host operating system 23 of the computer 21 starts to execute the auto-run function. In the case when there is no auto-run function or the auto-run function is currently inactive in the host operating system 23 of the computer 21, then at block 300, the portable device driver installation system inquires the host operating system 23 if the portable device driver has ever been installed in the computer 21.

Figure 3B:
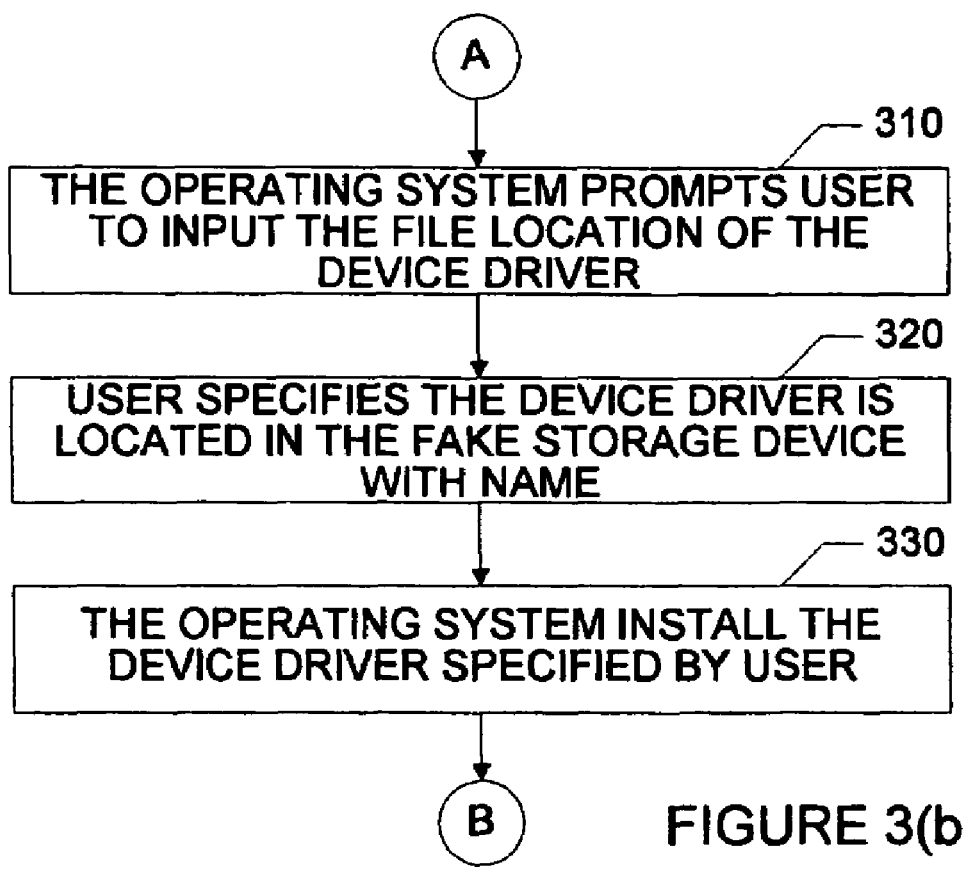

If both the auto-run function is currently unavailable and the portable device driver has not been installed, then the portable device driver installation system switches to a manual operation procedure shown in FIG. 3(b). Otherwise, if the auto-run function is currently unavailable but the portable device driver exists in the computer 21 then the portable device driver installation system switches to FIG. 3(c).

At block 230, when the host operating system 23 detects the fact that the portable device driver does not exist in the computer 21, at block 240, then the host operating system 23 executes the auto-run function for the installation of the portable device driver. Otherwise, if the host operating system 23 detects that the portable device driver already exists in the computer 21, then it skips the auto-run execution and switches to FIG. 3(c).

FIG. 3(b) illustrates a manual operation procedure for the installation of the portable device driver embedded in the external hard drive 14. As seen in FIG. 3(b) at block 310, the manual operation procedure starts by asking the user to load in the portable device driver to the computer 21. Then, at block 320, the user assigns the portable device driver to replace the dummy storage device in the file path of the computer 21. Specifically, in one embodiment, the computer will prompt the user that a new external hard drive has been found. At that point, the user will be asked by the computer to specify the location of the device driver for the new device by entering the path. This results in, at block 330, the host operating system 23 of the computer 21 executing the installation of the portable device driver according to the replaced file path.

Figure 3C:
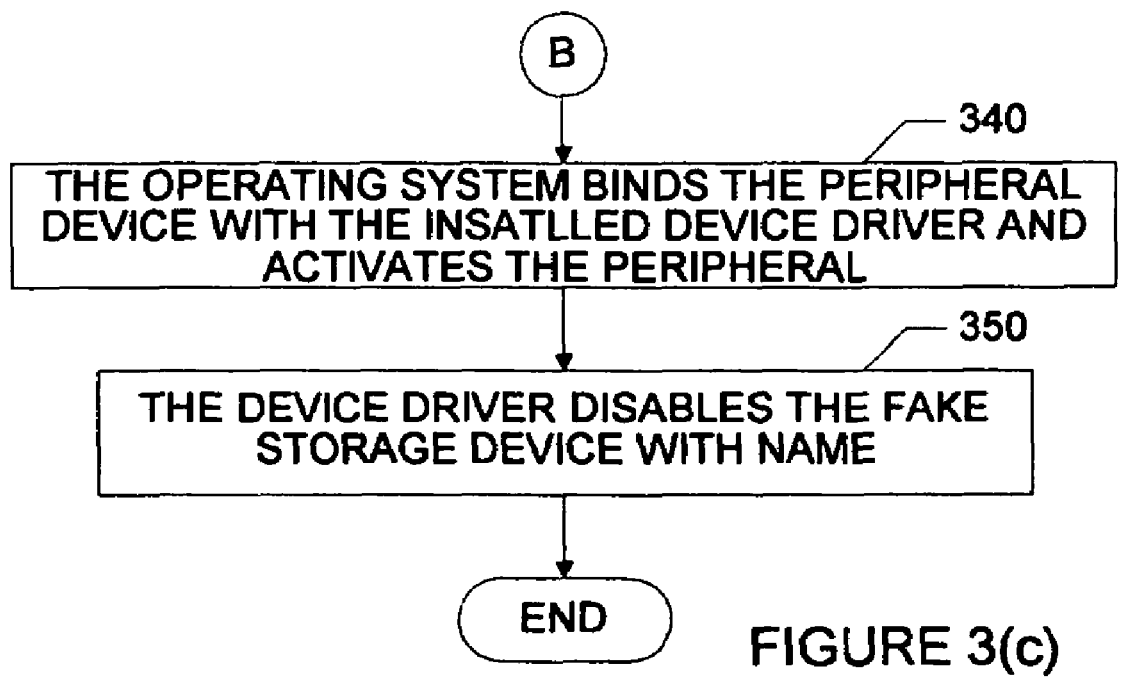

FIG. 3(c) illustrates the processing steps after the completion of the procedure shown in FIG. 3(a) or FIG. 3(b). At FIG. 3(c) block 340, the host operating system 23 binds the portable device driver into the computer 21. So that, as shown in block 350, when the operating system 23 enables the portable device driver and disables the dummy storage device, the computer 21 can provide the service of the portable device driver.

Figure 4:
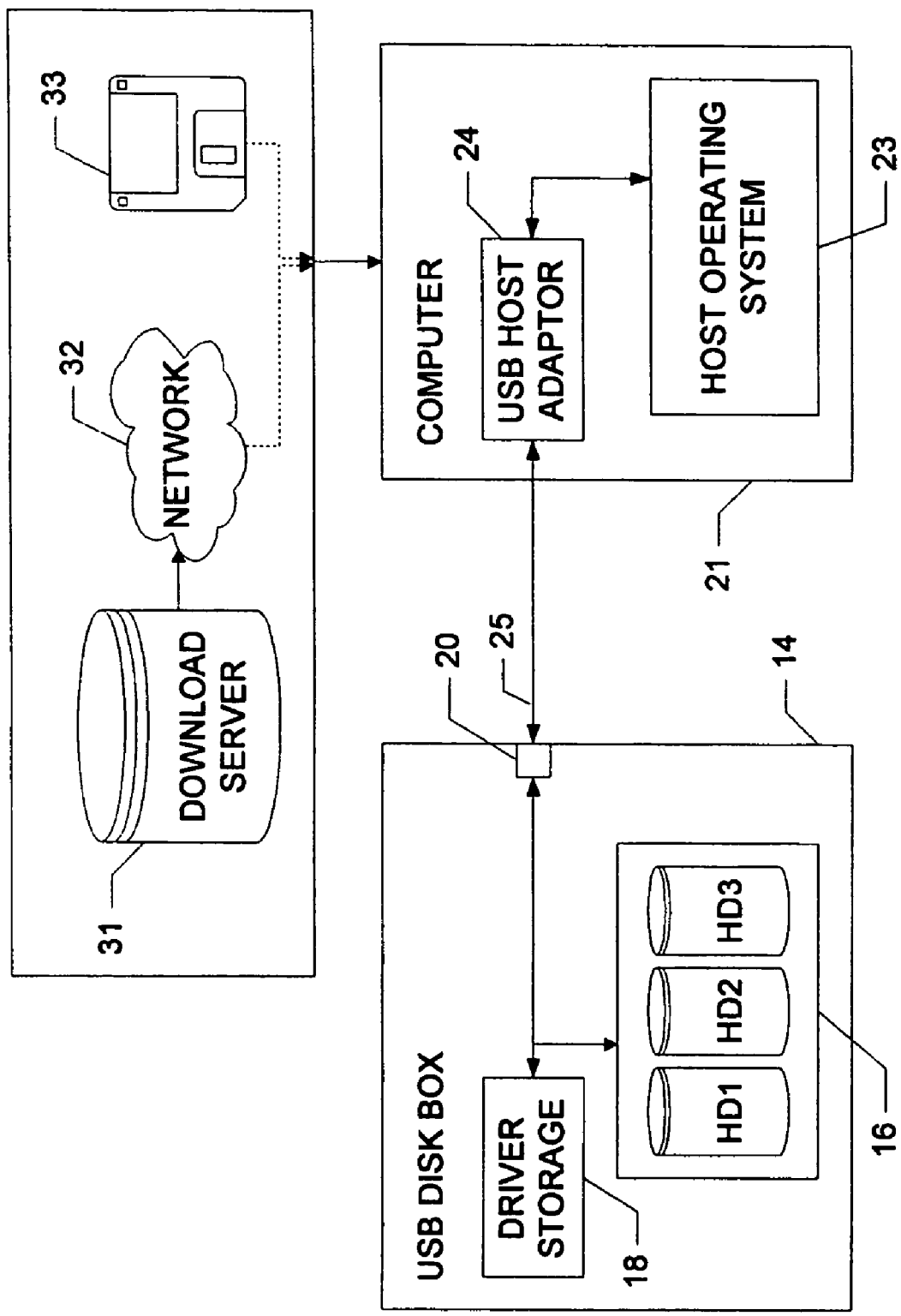
FIG. 4 is a diagram showing the upgrade of a portable device driver through networking in accordance with the present invention.

FIG. 4 illustrates an external hard drive that provides an upgradeable device installation system. The up-to-date portable device driver installer can be downloaded from a download server 31 via network 32 (such as the Internet or alternatively a LAN or WAN) or retrieved from a floppy 33. After the upgraded device driver installer is downloaded to the host operation system 23 from the download server 31 or from the floppy 33, the user can execute the downloaded upgraded device driver installer. The host operation system 23 first disables the device driver of the external hard drive 14, replaces the device driver of the external hard drive 14 in the host operating system with the new driver from download server 31 or floppy 33, and re-enables the device driver of the external hard drive. The driver storage 18 is activated by the host operating system 23 for updating the portable device driver, then, the driver storage 18 is deactivated.

Figure 5:
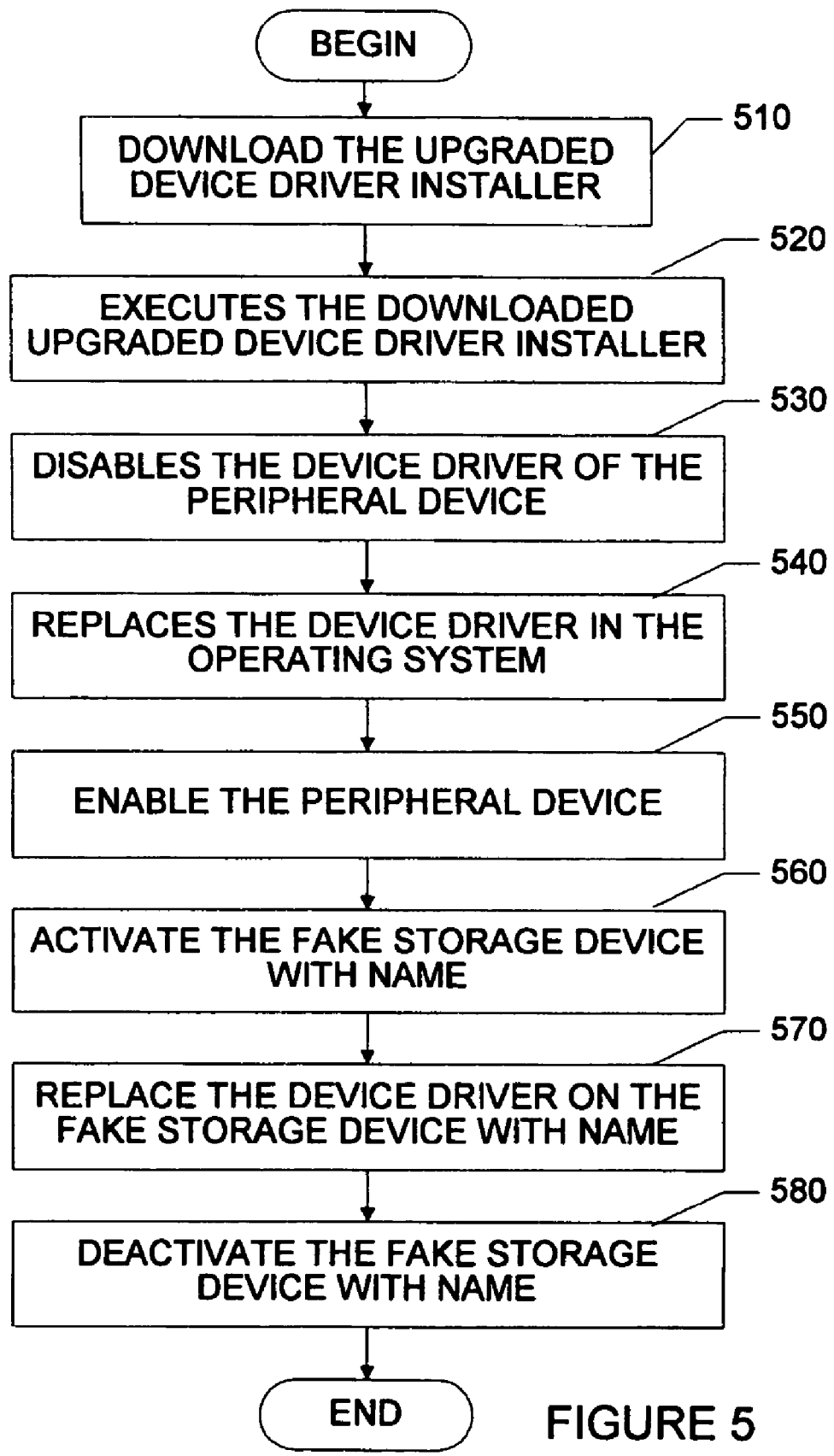
FIG. 5 is a flow chart depicting a system for the upgrade of a portable device driver in accordance with the present invention.

FIG. 5 shows the procedure of the upgrade of a portable device driver. First, at block 510, the user downloads the upgraded device driver installer from the download server 31 or floppy 33 to computer 21. Then, at block 520, the user can execute the downloaded upgraded device driver installer. Next, at block 530, the current portable device driver in the host operating system 23 is disabled. Then, at block 540, the portable device driver in the host operating system 23 is replaced with the downloaded upgraded portable device driver. Then, at block 550, the upgraded portable device driver is enabled again to provide services.

Further, during the portable device driver on the driver storage 18 upgrading process, at block 560, the driver storage 18 is activated before, at block 570, the portable device driver is replaced by the upgraded portable device driver. Then, at block 580, the driver storage 18 is deactivated again and this finishes the upgrading process.

To further illustrate the present invention, the external hard drive 14, when connected to a computer, can automatically install itself without any additional software that is not already stored by the external hard drive. The first time the external hard drive is connected to a computer, a startup wizard is initiated according to the process described above.

Figure 6A:
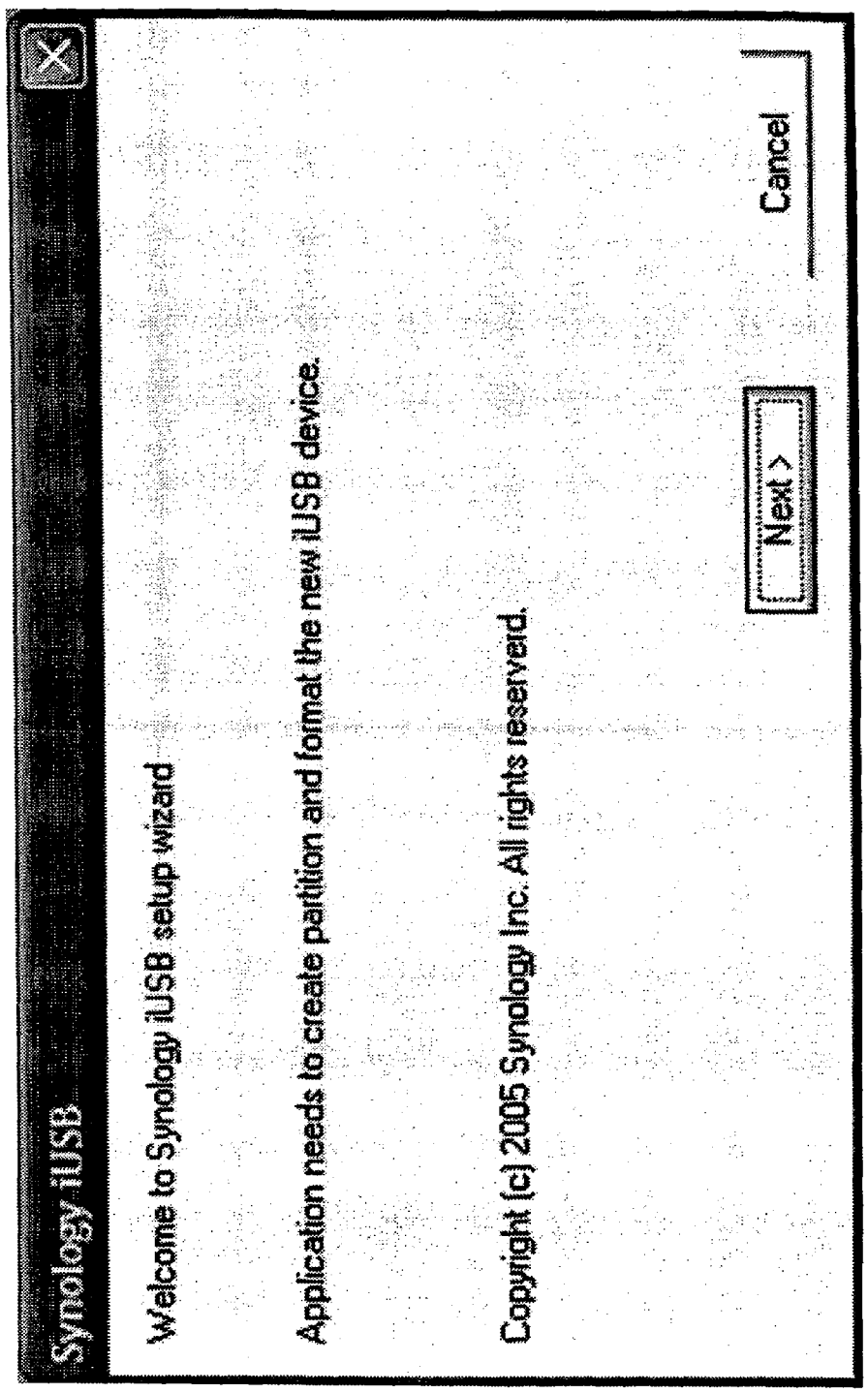
Figure 6B:
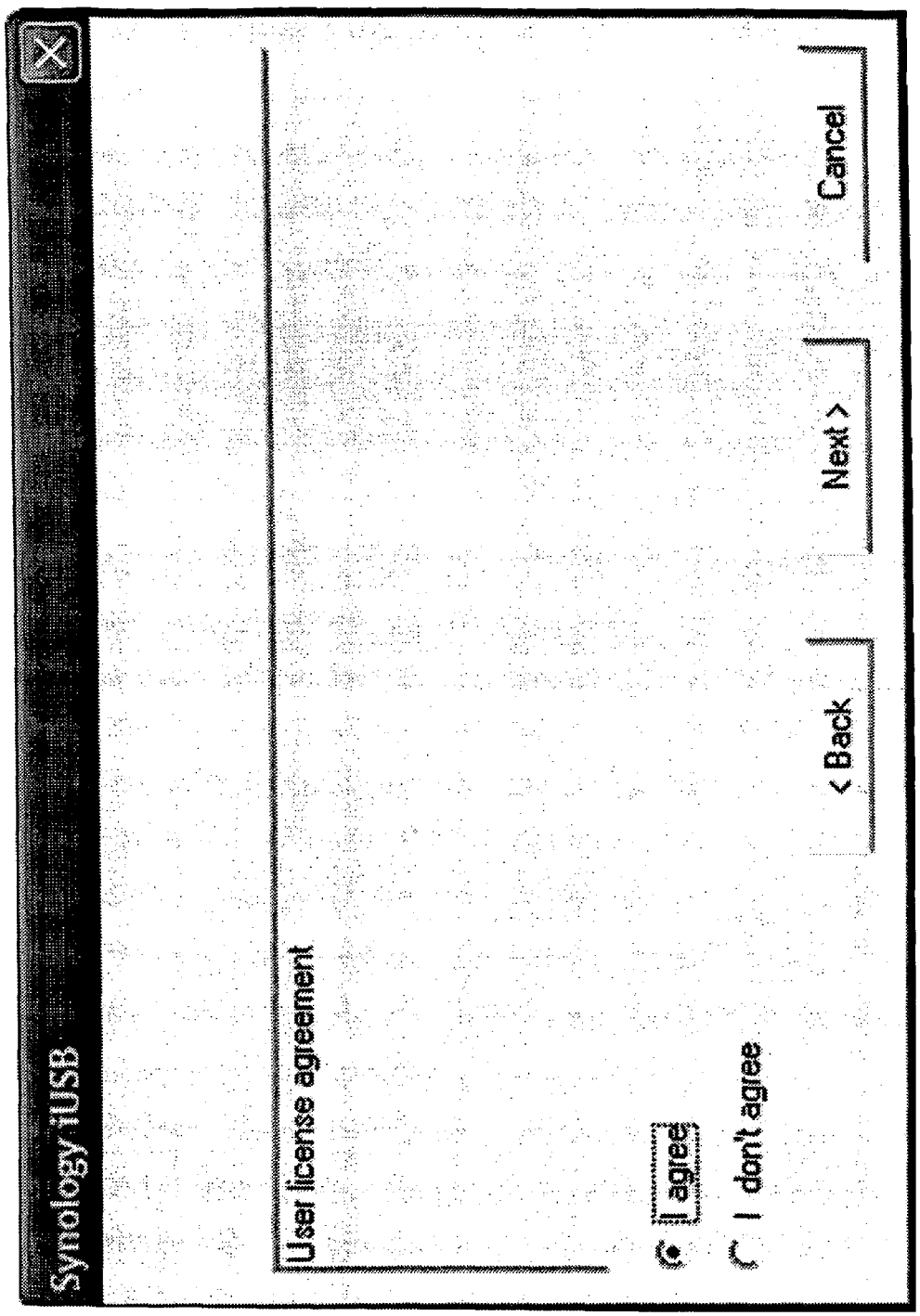
Figure 6C:
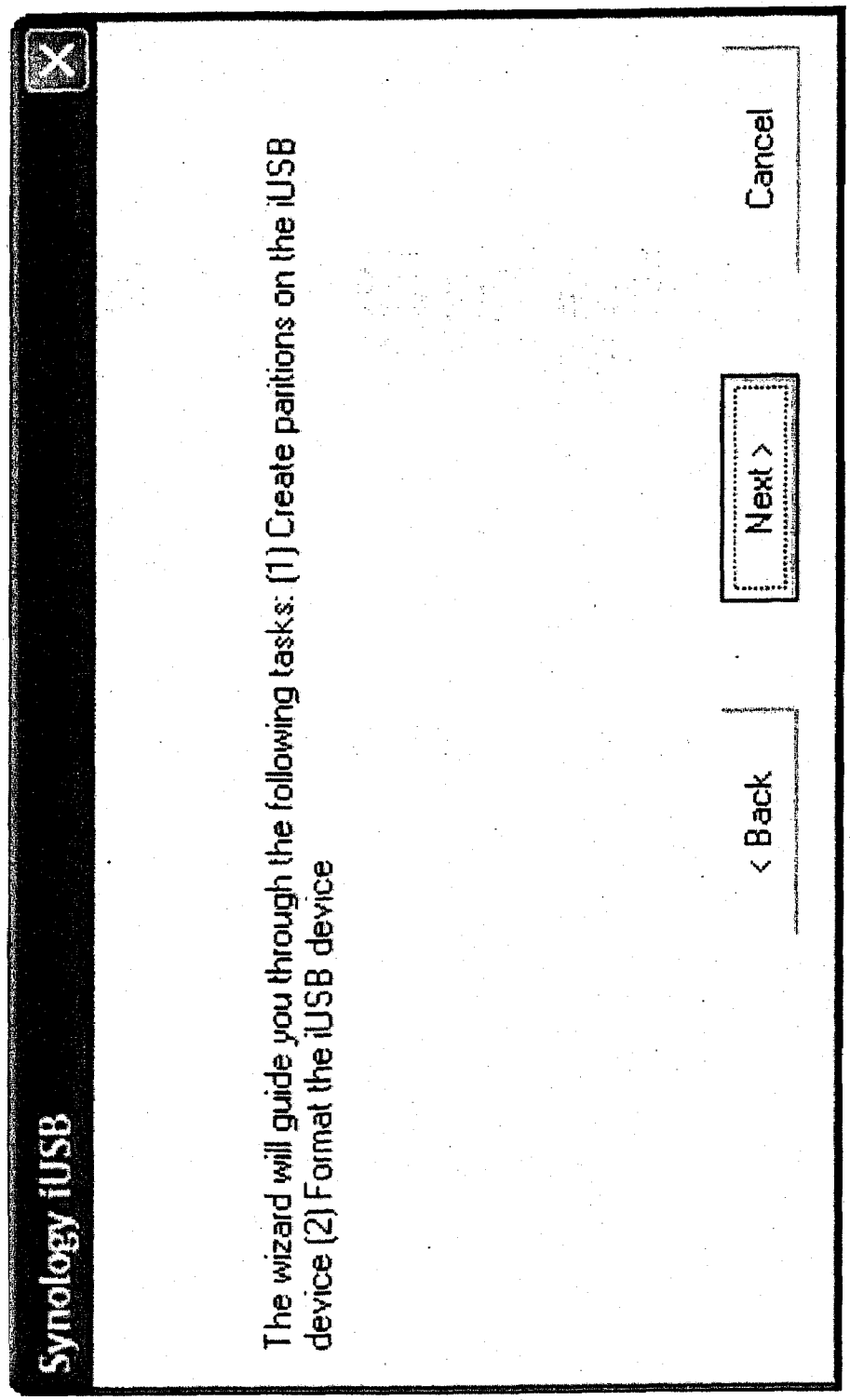
Figure 6D:
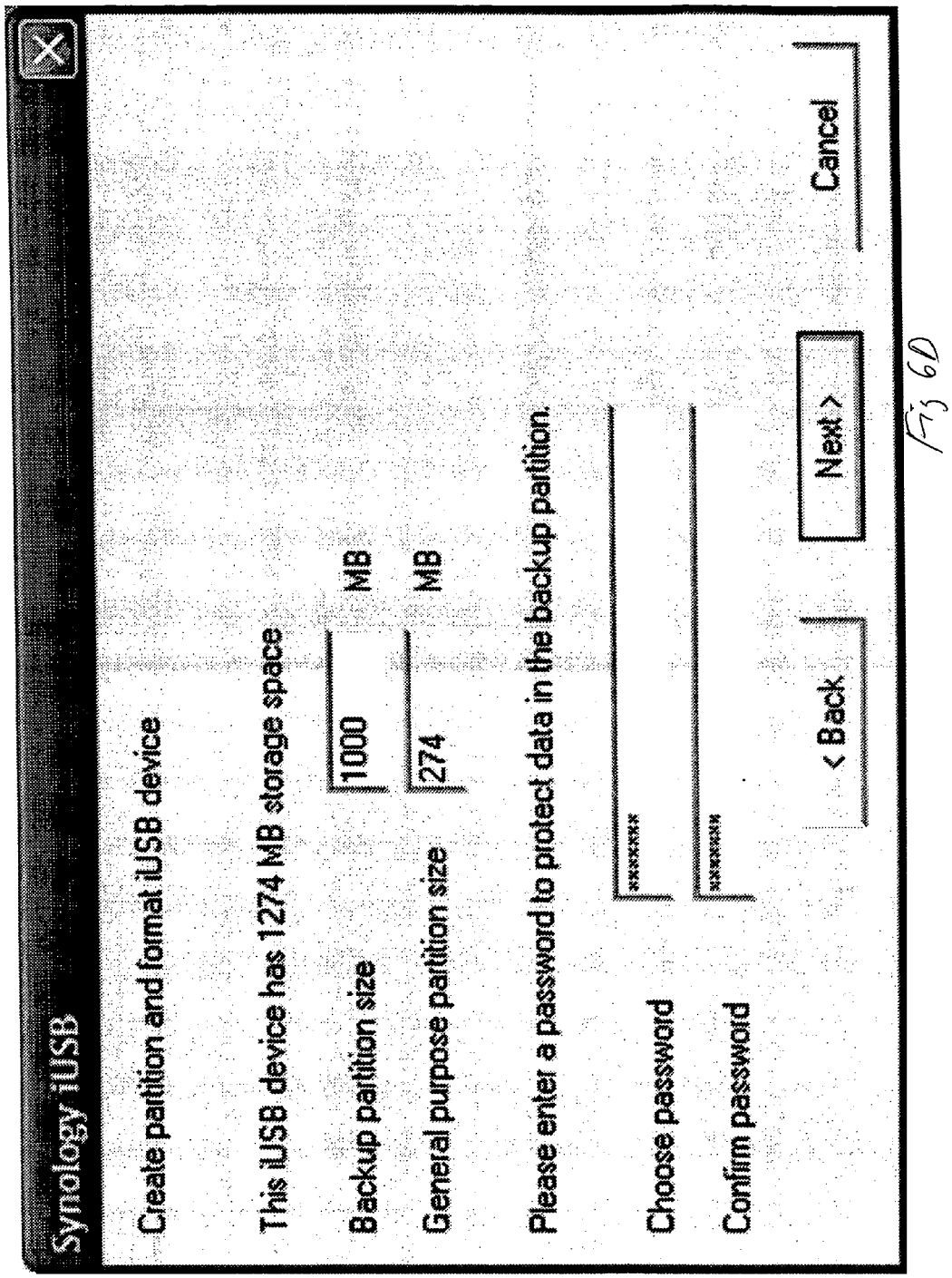
Figure 6E:
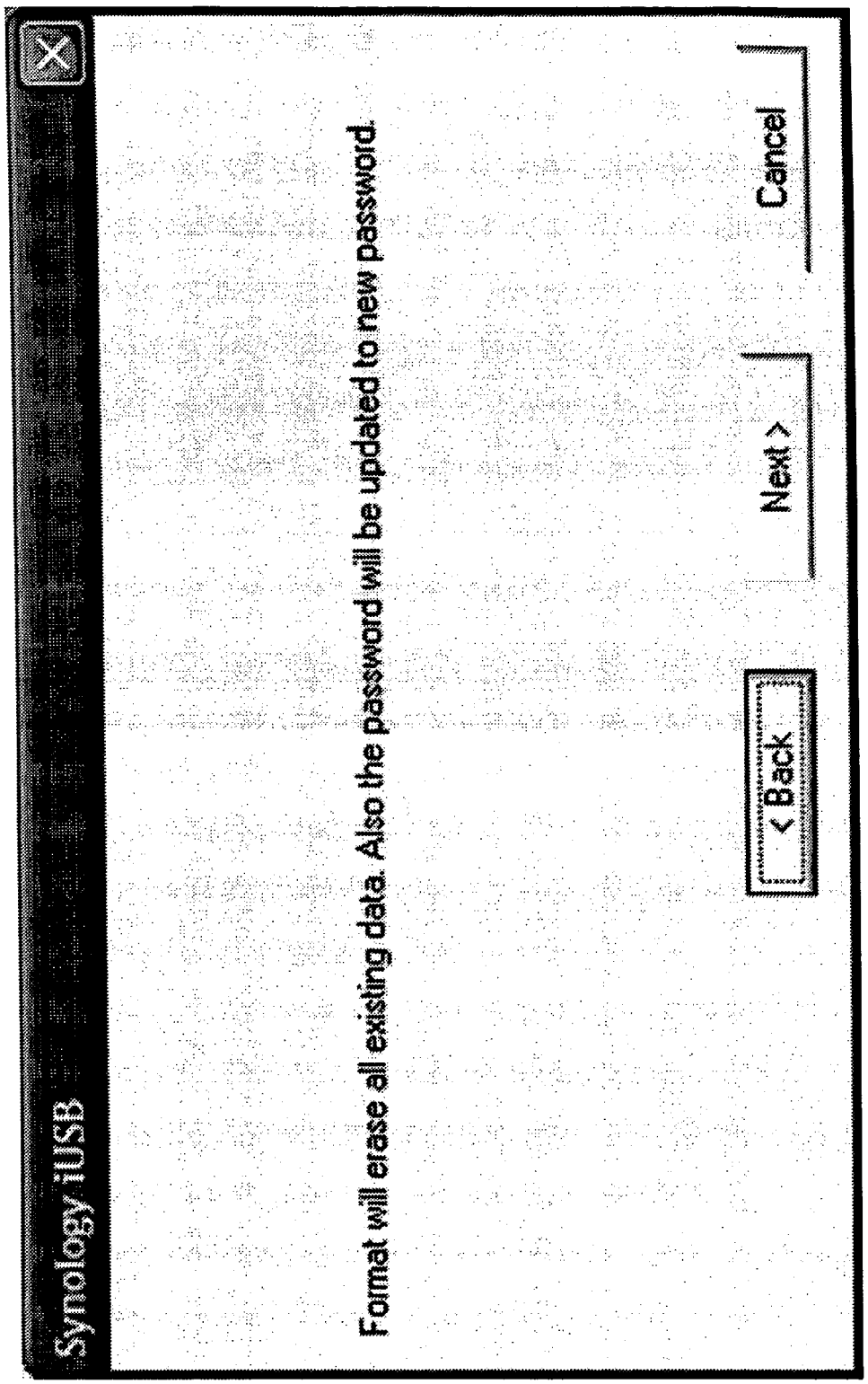
Figure 6F:
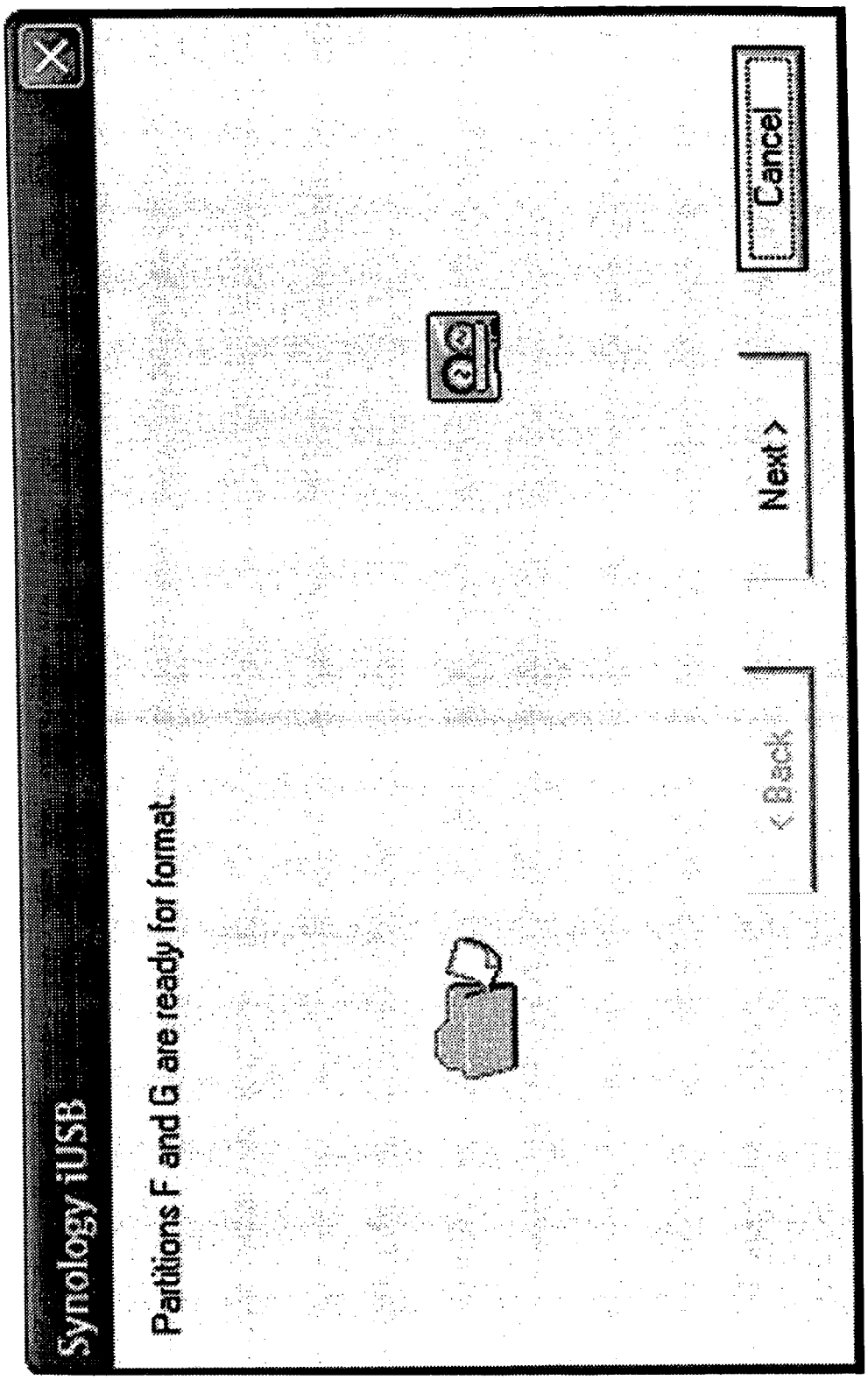
Figure 6G:
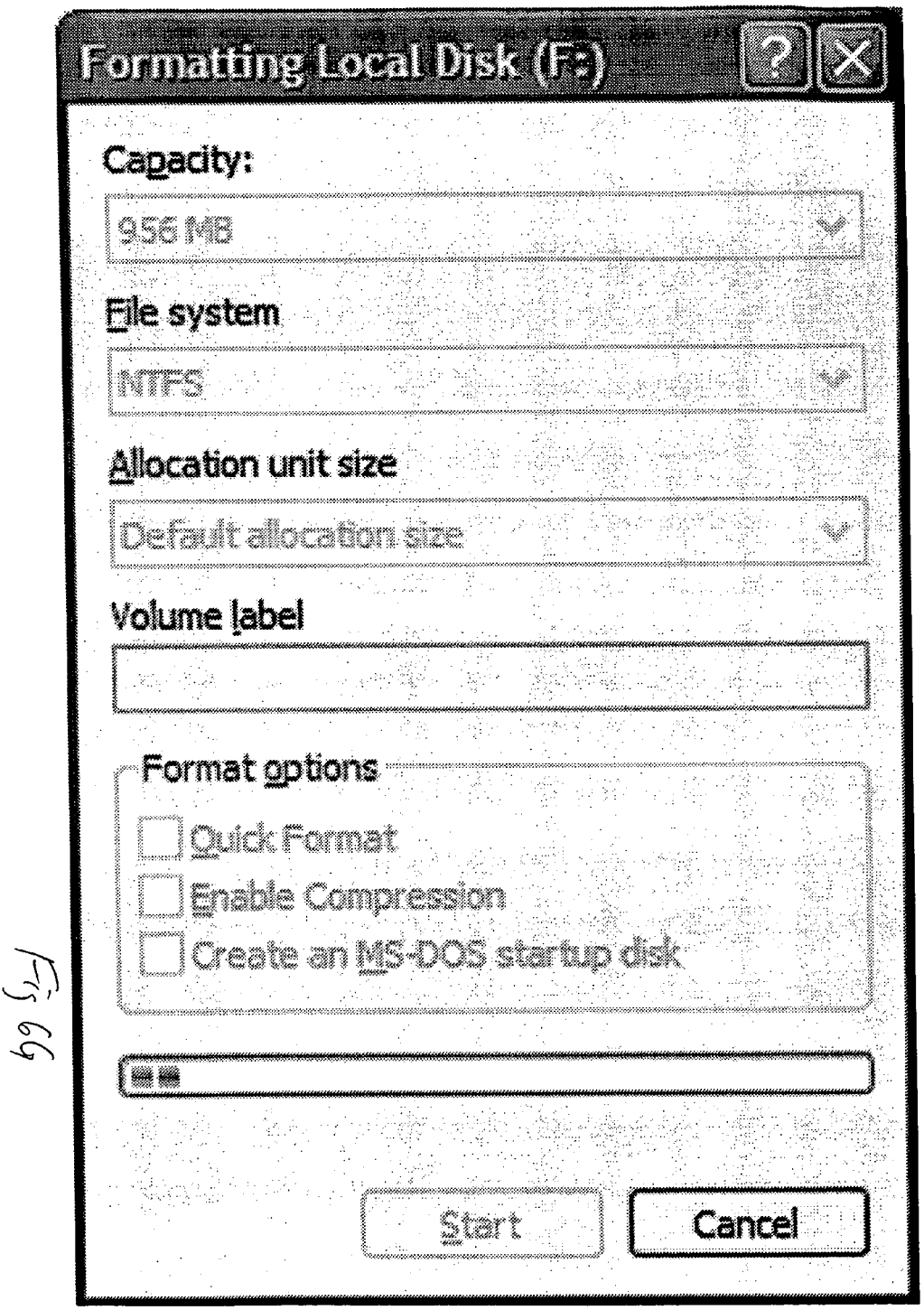

As seen in FIG. 6A, the setup wizard advises the user that the new external hard drive 14 is being attached and must be configured. Then, turning next to FIG. 6B, the user must agree to a generic user license agreement. Turning next to FIG. 6C, the installation wizard will partition the hard drive. As seen in FIG. 6D, the user has a choice of how to partition the hard drive as well as providing a password for securing data access. FIG. 6E shows a warning to the user as to the updating of the password and the erasing of existing data on the external hard drive 14. FIGS. 6F and 6G show additional screenshots of the user interface showing the installation of the external hard drive 14.

Figure 7:
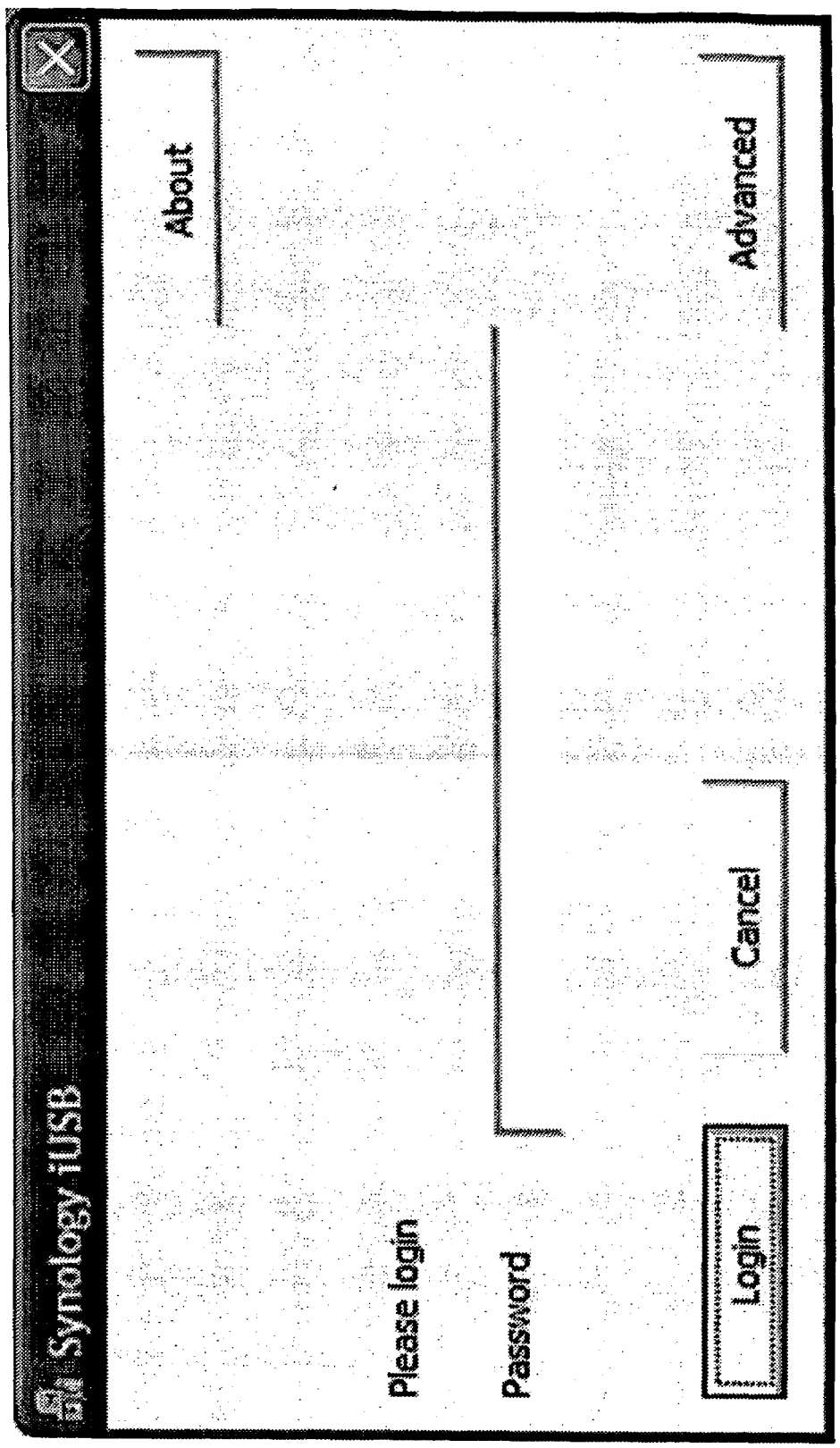

The process of FIGS. 6A-6G is performed during the initial installation of the external hard drive 14 to a computer. Additional connections of the external hard drive 14 to the same computer will result in the automatic pop up of password page as shown in FIG. 7. The user will then enter the password and will have access to the data on the external hard drive 14. Finally, FIG. 8 shows a screenshot of how the user can change the password of the external hard drive 14.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular words, respectively. Additionally, the words "herein," "above," "below," and words of similar import, when used in this application, shall refer to this application as a whole and not to any particular portion of this application.

The above description of illustrated embodiments of the invention is not intended to be exhaustive or to limit the invention to the precise form enclosed. While specific embodiments of, and examples for, the invention are described herein for illustrative purposes, various equivalent modifications are possible within the scope of the invention, as those skilled in the relevant art will recognize.

We claim:

1. An external back up hard drive for connection to a computer, the hard drive comprising:
    means for sending a request signal from the external back up hard drive to an operating system of the computer;
    means for detecting an acknowledgement by the operating system of the request issued from the external back up hard drive;
    means for responding with a message indicating and presenting the external back up hard drive to the operating system as both a dummy storage device as well as an external hard drive, wherein said operating system enables the external hard drive and the dummy storage device, and further indicating to said operating system that there is an auto-run file in said dummy storage device;
    means for checking, by the host operating system, if the operating system can automatically execute the auto-run file stored in the dummy storage device;
    means for installing, by the operating system, an external hard drive driver stored in the dummy storage device when an auto-run function of the operating system is active;
    means for binding, by the host operating system, the external hard drive driver to the external hard drive; and
    means for reverting, by the host operating system, to a manual operation procedure when the auto-run function is inactive.

2. The external back up hard drive of claim 1, wherein said means for operating a manual procedure to continue the installation of the external hard drive driver when the auto-run function of the host operating system is inactive, comprises:
    means for checking, by the host operating system, if the external hard drive driver already exists in a file path of the computer;
    means for binding, by the host operating system, the external hard drive driver in the file path of the computer with the external hard drive;
    means for requesting, by the host operating system, a user to select a file path that leads to the dummy storage device;
    means for copying, by the host operating system, the external hard drive driver stored in the dummy storage device to the computer;
    means for binding, by the operating system, the external hard drive driver to the external hard drive; and
    means for deactivating, by the host operating system, the dummy storage device.

3. The external back up hard drive of claim 1, wherein said means for upgrading an external hard drive driver through the external and/or internal buses of a computer comprises:
    means for downloading an upgraded external hard drive driver to the computer;
    means for disabling, by the host operating system, the external hard drive;
    means for replacing, by the host operating system, the existing external hard drive driver by the upgraded external hard drive driver;
    means for enabling, by the host operating system, the external hard drive;
    means for activating, by the host operating system, the dummy storage device;
    means for replacing, by the host operating system, the external hard drive driver in the dummy storage device with the upgraded external hard drive driver; and
    means for deactivating, by the host operating system, the dummy storage device.

4. A method for installing an external back up hard drive onto a computer, said external back up hard drive having integrated therewith a dummy storage device for storing an external hard drive driver, the method comprising:
    sending a request signal from the external back up hard drive to an operating system of the computer;
    detecting an acknowledgement from the operating system of the request signal;
    responding with a message indicating and presenting the external back up hard drive to the operating system as both said dummy storage device and an external hard drive, wherein said computer enables the external hard drive and the dummy storage device, and further indicating to said operating system that there is an auto-run file in said dummy storage device;

checking if the operating system can automatically execute the auto-run file of the dummy storage device;

installing, by the operating system, the external hard drive driver stored in the dummy storage device when an auto-run function of the operating system is active; and binding by the operating system the external hard drive driver to the external hard drive.

5. The method of claim 4 further including:

reverting, by the operating system, to a manual operation procedure when the auto-run function is inactive; and deactivating, by the operating system, the dummy storage device.

6. The method of claim 5 wherein said means for operating a manual procedure to continue the installation of the external hard drive driver when the auto-run function of the host operating system is inactive operates by:

checking, by the host operating system, if the external hard drive driver already exists in a file path of the computer;

binding, by the host operating system, the external hard drive driver when the external hard drive driver does exist in the file path of the computer;

requesting, by the host operating system, a user to select a file path that leads to the dummy storage device;

copying, by the host operating system, the external hard drive driver stored in the dummy storage device to the computer;

binding, by the operating system, the external hard drive driver copied from the dummy storage device to the external hard drive; and deactivating, by the host operating system, the dummy storage device.

7. The method of claim 5 wherein the manual operation procedure for the installation of said external hard drive driver into said computer further comprises:

checking, by the host operating system, if the external hard drive driver is already in a file path of the computer;

binding the external hard drive driver with the external hard drive when the external hard drive driver exists in the file path of the computer; or requesting a user to select a file path that leads to the dummy storage device;

installing and binding the external hard drive driver stored in the dummy storage device with the external hard drive; and disabling the dummy storage device by the host operating system.

8. The method of claim 4, further comprising upgrading the external hard drive driver via an external connector connected to the bus of the computer by:

downloading an upgraded external hard drive driver to the computer;

disabling, by the host operating system, the external hard drive;

replacing, by the host operating system, the existing external hard drive driver with the upgraded external hard drive driver;

enabling, by the host operating system, the external hard drive; and triggering, by the host operating system, the activation of the dummy storage device.

9. A computer storage medium containing instructions for performing the method of claim 4.

10. A method for installing an external back up hard drive onto a computer, comprising:

detecting a connection of the external back up hard drive to the computer;

performing inquiry of the detected external back up hard drive;

recognizing and enabling the external back up hard drive as both a disk drive and an external hard drive, the disk drive containing a driver for the external hard drive;

determining whether an auto-run function is available on the computer;

if the auto-run function is available, then executing the auto-run function to install the driver for the external hard drive;

if the auto-run function is unavailable, determining whether the computer already contains the driver for the external hard drive;

if the computer already has the driver for the external hard drive, binding the driver with the external hard drive and activating the external hard drive; and if the computer does not contain the driver for the external hard drive, then requesting and accepting a file path that leads to the dummy storage device, copying the driver stored in the dummy storage device to the computer, and binding the driver copied from the dummy storage device to the external hard drive.

11. A computer storage medium containing instructions for performing the method of claim 10.

* * * * *